United States Patent [19]
Pradota

[11] 3,927,892
[45] Dec. 23, 1975

[54] MACHINE CHUCK JAWS AND THE METHOD OF MAKING THE SAME

[76] Inventor: Thaddeus T. Pradota, 6 N. 323 Andrene Lane, Itasca, Ill. 60143

[22] Filed: July 8, 1974

[21] Appl. No.: 486,387

[52] U.S. Cl. .............................................. 279/62
[51] Int. Cl.² ..................................... B23B 31/04
[58] Field of Search ................ 279/62, 61, 60, 69

[56] References Cited
UNITED STATES PATENTS
| | | | |
|---|---|---|---|
| 1,532,328 | 4/1925 | McConnell | 279/62 |
| 3,727,931 | 4/1973 | Wightman | 279/62 |

FOREIGN PATENTS OR APPLICATIONS
| | | | |
|---|---|---|---|
| 1,013,414 | 7/1952 | France | 2/62 |

OTHER PUBLICATIONS

Primary Examiner—J. M. Meister

[57] ABSTRACT

An improved jaw for a machine chuck of the Jacobs type having the teeth which mesh with the ring gear so formed as to eliminate virtually all play which has been characteristic of the jaws in chucks of this type heretofore available.

8 Claims, 18 Drawing Figures

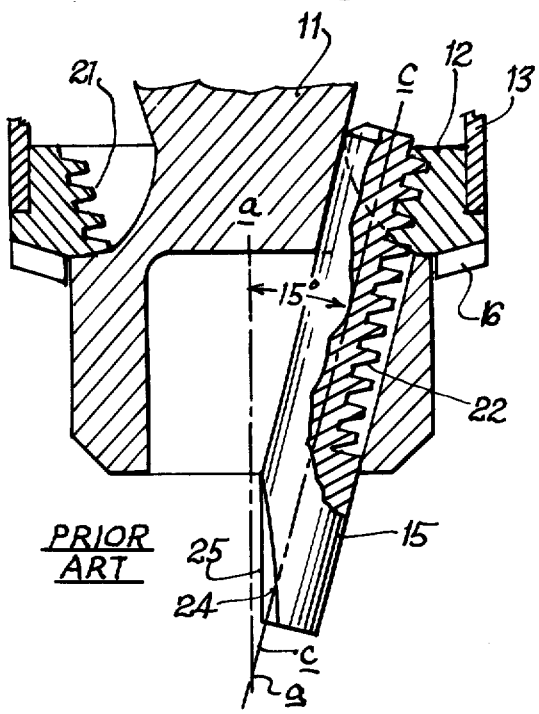
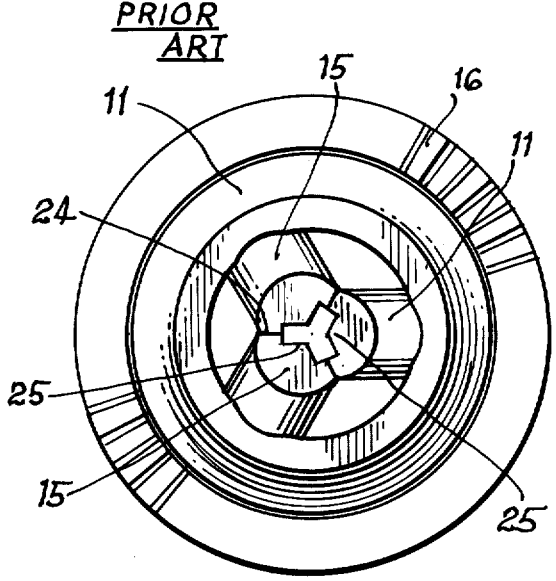
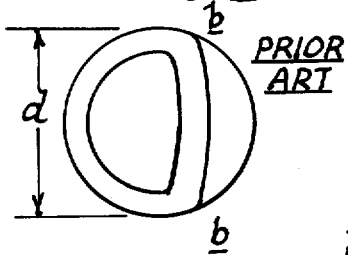
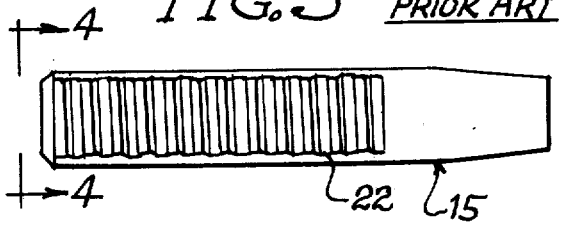
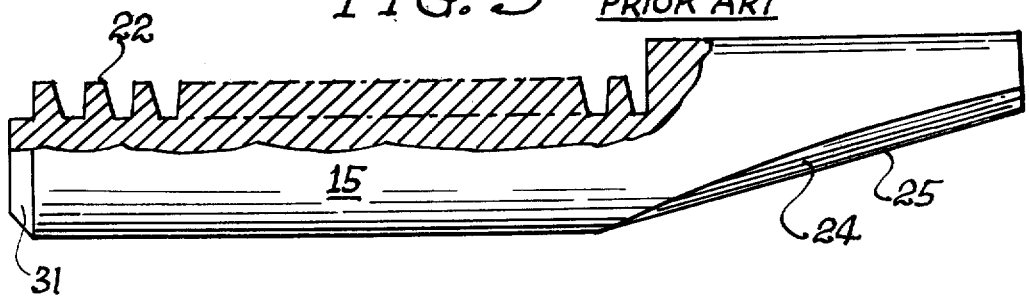

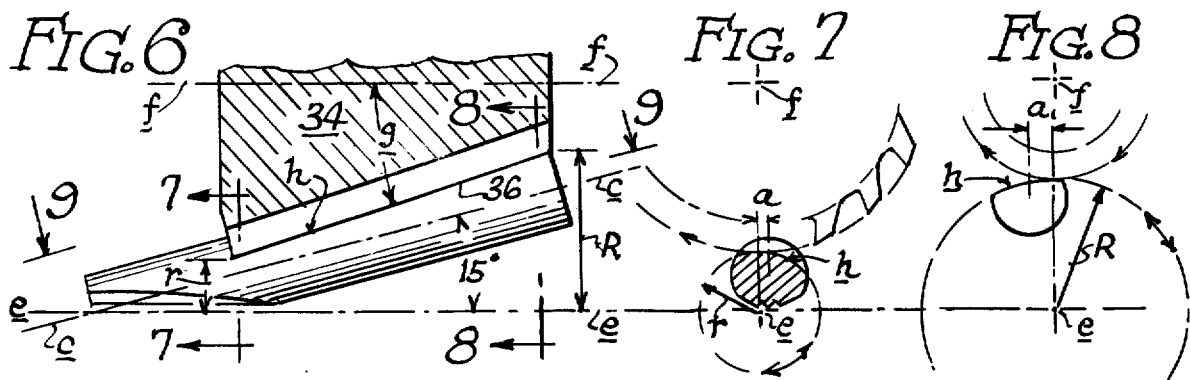
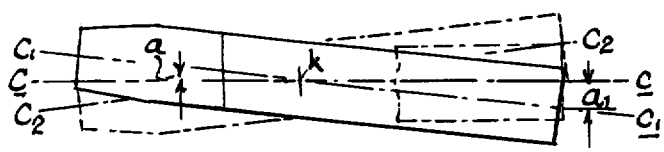
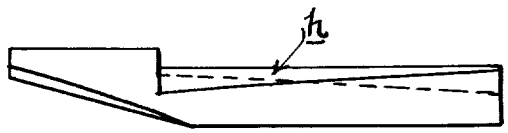
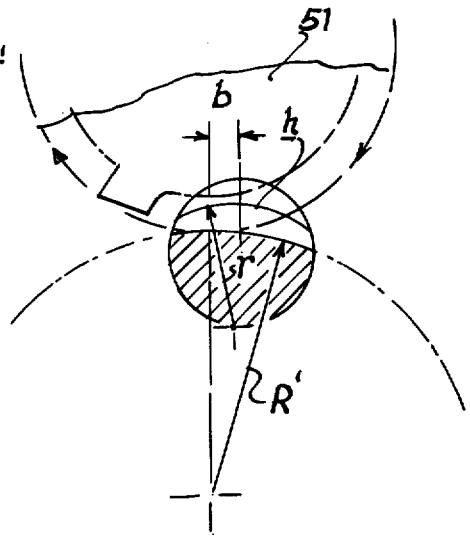
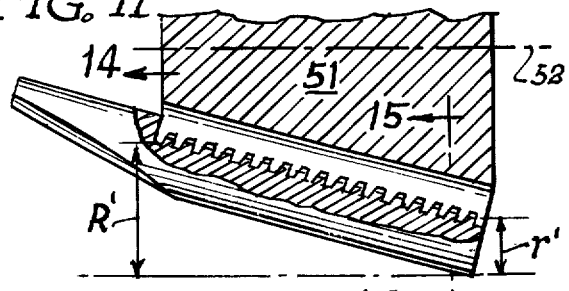
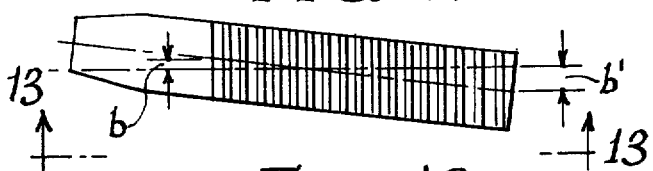
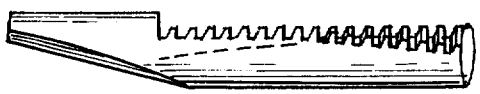
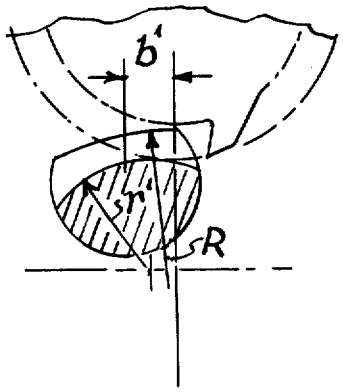

MACHINE CHUCK JAWS AND THE METHOD OF MAKING THE SAME

BACKGROUND OF THE INVENTION

Chucks of the Jacobs pattern are well-known and rely on three jaws spaced 120° apart to grip the drill bit or other tool. The jaws are guided for extension and retraction as a set in suitable bores in a body. The direction of travel of the jaws is so selected as to cause the jaws to converge radially and axially to gripping relation with the bit. Such action is the result of using a ring gear secured to a sleeve rotatably mounted on the body and operable either manually or through the medium of a chuck key. In any case, the thread of the ring gear is cut on a conical surface, and this thread is in mesh with the teeth on all of the jaws. Thus, the arrangement is essentially one in which rotation of the sleeve is translated into joint travel of the jaws on their respective axes. Since all of the jaws are actuated by a common ring gear, the chuck is self-centering.

Since the helix cut in the ring gear lies on a conical pitch line surface, its diameter changes continuously from one end (larger or inner end) to the other end (smaller or outer end). However, the jaw teeth may be likened to a rack. Unless play were allowed between the jaw teeth and the ring gear helix, binding will occur, for the reason that the meshing helix changes in diameter with respect to the jaws as the same are extended and retracted. Consequently, it has been the practice to reach a compromise by deliberately introducing clearance between the helix and the jaw teeth. Stated otherwise, the teeth of the jaws have a curvature along their length which is a compromise between the curvature of the helix at its larger end and that at its smaller end. The net result allows the jaws to rock on their respective longitudinal axes through a small angle with consequent inaccuracy in engaging the bit or other tool being gripped. For many purposes, miscentering of the bit may be acceptable but for close work, it may prove intolerable.

SUMMARY OF THE INVENTION

The invention resides in a jaw for a Jacobs type chuck having teeth which have a curvature of some defined radius at the root and a curvature of another radius at the crest. The respective curvatures may have a center of curvature which lies away from a plane which passes through the axis of the chuck and the axis of the jaw or the plane may pass through both axes. The compromise in tooth form is obtained by (1) cutting the root of the teeth in the jaw in such a way that the ring gear helix clears the root and (2) cutting the crest of the teeth in the jaw in such a way that the root of the ring gear helix and the crest of the jaw teeth are virtually osculatory. The position of the jaw during cutting of the teeth therein takes account of the helix angle of the conical helix of the thread in the ring gear.

BRIEF DESCRIPTION OF THE DRAWING

FIG. 1 is combined cross section and side elevation of a portion of a Jacobs type chuck;

FIG. 2 is a bottom plan view of the chuck shown in FIG. 1;

FIG. 3 is an elevation of a jaw according to the prior art, as seen facing the teeth;

FIG. 4 is an end elevational view as seen in the direction of the arrows 4—4;

FIG. 5 is a side elevation of the jaw of FIG. 3, as seen looking endwise of the teeth;

FIG. 6 is a detail to illustrate the first cut on the jaw blank;

FIG. 7 is a cross section taken on the line 7—7 of FIG. 6;

FIG. 8 is a cross section taken on the line 8—8 of FIG. 6;

FIG. 9 is an elevational view as seen in the direction of the arrows 9—9 of FIG. 6;

FIG. 10 shows the planes of the crest and root, respectively, following both milling operations in forming the jaw teeth;

FIG. 11 shows the position of the jaw with respect to the milling cutter during milling of the jaw teeth;

FIG. 12 shows the relative position of the milling cutter axis and the jaw axis when compensating for the helix angle of the ring gear thread;

FIG. 13 is a view looking in the direction of the arrows 13—13 of FIG. 12;

FIG. 14 is a cross section taken on the line 14—14 of FIG. 11;

FIG. 15 is a cross section taken on the line 15—15 of FIG. 12;

DESCRIPTION OF THE PREFERRED EMBODIMENTS

Figure 17:
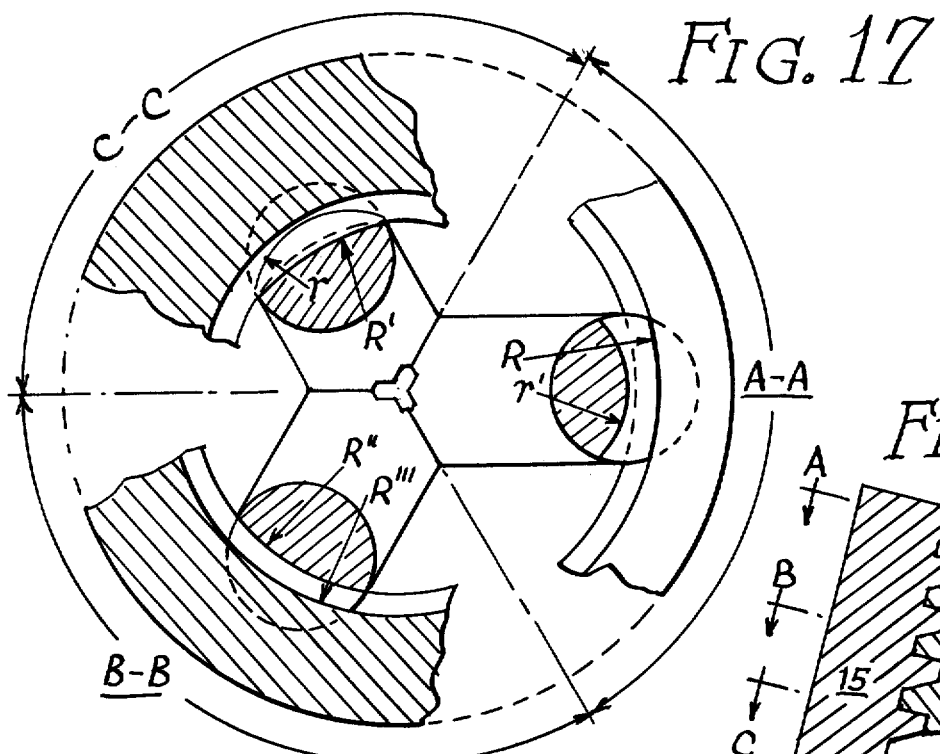
FIG. 17 is a composite cross section through the chuck to show the relation of the ring gear teeth to the jaw teeth, taken on the lines A—A, B—B and C—C, respectively, of FIG. 16.

Where reference is made in the description and claims to the thread of the ring gear, it will be understood that a multiple thread is also included and, correspondingly, where pitch of this thread is referred to, the term will be understood to be the displacement of the driven member in the direction of the axis of the helix, when the helix is rotated one revolution. Further, it will be understood, in the example, that the thread of the ring gear follows a helix described on a conical surface, referred to herein as the conical pitch surface, and that this helix of gradually diminishing diameter has its turns uniformly spaced along the conical surface. By way of example, the thread of the ring gear and the meshing teeth of the jaws are shown as of buttress form in accordance with the present commercial practice. However, other thread forms are in contemplation.

Additionally, it will be understood that the teeth of the several jaws, each regarded as a set of teeth, are displaced in the direction of the slope of the conical pitch surface by an amount equal to the pitch of the ring gear thread divided by the number of jaws.

In cutting the teeth on the jaws in accordance with the invention, the same could be held on a fixture in sets and the cutter and work operated with the helix angle and pitch of the cutter arranged in accordance with these factors, in conformity with the conical thread of the ring gear. Alternatively, one of the set of three jaws may be mounted on a fixture and cut singly with the required helix angle and pitch, until a reasonable production quantity has been run. Then, the fixture or cutter is shifted axially by one third of the pitch distance and the second jaw of a set run in a production quantity. This is followed similarly for the third jaw of the set. The procedure just described is used in fabricating jaws of the conventional type and, as will appear, the same procedure may be employed in connection with the jaws to be disclosed herein. Obviously, each kind of jaw is properly identified by stamping or appropriate segregation. It will be understood that the helix angle of the jaw teeth is the result of displacing the axis of the jaw relative to the axis of the cutter.

In FIG. 1, there is shown, partially in longitudinal cross section, a machine chuck of the well-known Jacobs' type, comprising a body 11, a ring gear 12, a shell 13 carrying the ring gear, and a set of three cylindrical jaws 15, only one of which is shown. The ring gear 12 may be rotated by gripping the shell 13, or by using a key which includes a bevel pinion meshing with the teeth 16 of the ring gear 12, all as is well-known. The ring gear has a single pitch thread 21, the helix of which lies on a conical surface having its apex on the axis of the chuck. The tooth form of the thread 21 is generally of buttress form, substantially as shown, but the invention is not to be regarded as limited to a particular tooth form. Each jaw 15 is in mesh with the ring gear thread through a series of teeth 22 cut into each jaw (FIG. 3). Upon rotation of the ring gear the three jaws, operating as a set, are traversed axially into or out of gripping relation with the drill bit or other object held in the chuck. By reason of the precise relation between the thread 21 and three sets of teeth 22, the jaws, in the absence of a tool to be gripped, will meet on the axis of the chuck (FIG. 2). In order that the jaws will come together for the gripping of small tools or other objects, flat surfaces 24 are provided for each jaw (FIG. 2). In between the faces 24—24 of each jaw, there is a ridge 25 to bite into the gripped object.

In present day designs of Jacobs' chucks, the apex angle of the ring gear cone is 30° referred to the axis of the cylindrical jaws, as indicated by the legend 15° in FIG. 1.

Since the thread 21 lies on a conical surface, the pitch diameter, as measured in planes perpendicular to the principal axis $a—a$ of the chuck, varies from a maximum to a minimum. However, the reference to pitch diameter is approximate since reference is made to measurement of the angle between a plane which is perpendicular to the principal axis of the chuck and a line which is described on a conical surface intersecting said plane. An angle which so varies is, however, close enough for all practical purposes, since the variation occurs within small angular limits. Consequently, the teeth 22 must have a curvature $b—b$ (FIG. 4) from one side to the other, which is a compromise forced by the varying pitch diameter. Stated otherwise, a curvature $b—b$ intended to mesh with the smallest ring gear pitch diameter falls short of meshing with the largest ring gear pitch diameter. An acceptable compromise, therefore, dictates allowance for fit or clearance which, in turn, results in unacceptable back-lash if binding is to be avoided. This condition may be better understood by considering FIG. 2, wherein the clearance is reflected in freedom of the jaws to rock on their respective principal axis, viz. the axis $c—c$ of FIG. 1. Thus, the gripping surfaces 25 may hold the gripped object at positions other than 120° apart, which produces runout of the object, e.g. the point of a drill bit.

In accordance with the invention, a compromise in the configuration of the jaw teeth is obtained with virtually no allowance for clearance and the noncomitant, objectionable back lash.

A jaw blank is prepared from cylindrical stock of diameter $d$ (FIG. 4) with a working end including the flats 24 and gripping ridge 25 (FIGS. 1, 2 and 5). The chamfer 31 is optional. The blank is held (FIG. 6) in a fixture (not shown) with its axis $c—c$ at an angle of 15°. The fixture is arranged to swing on its axis $e—e$, while a milling cutter 34 is rotated on its own axis $f—f$. The cutter has a frusto-conical cutting face 36 which has an angle $g$ to the cutter axis. As a result of the respective motions of the cutter and blank, a surface $h$ is cut into the blank. Because of the non-parallel relation of the axis $c—c$ with respect to the cutter face 36, the surface $h$ (FIG. 9) has a radius $r$ at the working end (left end) of the jaw (FIG. 7) and a larger radius R (FIG. 8) at its opposite end. In addition to the relative positions of the cutter axis and blank axis respectively as seen in the vertical plane (FIG. 6), the blank axis is angled with respect to the cutter axis to correspond to the helix angle of the ring gear thread. This latter angular displacement is shown at $a$ and $a$, in FIGS. 7 and 8, respectively, and these are shown also in top plan in FIG. 9. In this view, two other possible positions of the axis $c—c$ are shown, namely, $c_1—c_1$ and $c_2—c_2$.

From a consideration of FIGS. 6, 7 and 8, the smaller radius $r$ gradually changes to a large radius R as one moves along the blank from left to right (FIG. 6) or, stated otherwise, the deeper curvature $h$ is toward the end where the smaller pitch circle of the ring gear thread obtains and the shallower curvature R is toward the end where the larger pitch circle of the ring gear thread exists.

For some applications and as will appear subsequently, it is preferred that the cut surface $h$, be skewed otherwise. FIG. 9 illustrates two of these possible alternates where the axis of the jaw is represented by $c_1—c_1$ or $c_2—c_2$. Although these latter axes and the axis $c—c$ are shown as passing through a common point $k$, this point may be otherwise located in space, depending upon the working relation desired between the jaw teeth and the ring gear thread.

FIG. 10 is a side elevation of the jaw of FIG. 6. The skewed surface $h$ resulting from relative orientation of the jaw blank and cutter is readily seen.

Now the blank jaw having the surface $h$ cut thereinto is set up for cutting of the teeth therein. For this step, the jaw is held in another swingable fixture, but at an angle to the axis of the fixture which is reversed to that of FIG. 6. Thus, turning to FIGS. 11 to 15, a milling cutter 51 is rotated on its axis 52, the cutter blades being toothed as shown corresponding to the tooth form which is to mesh with the ring gear thread (FIG. 1). The cutter is so positioned that the surface $h$ is not touched while the root of the teeth are being cut (FIG. 14). It is to be noted that the jaw is rocked about the axis of the fixture while cutting proceeds.

Furthermore, the blank is positioned to obtain the correct helix angle for the teeth to be cut therein. As pointed out above, the jaw teeth necessarily have the same, or essentially the same helix angle as the thread 21 of the ring gear. It will be recalled that, due to the varying pitch diameter of the ring gear thread and the constant pitch thereof, the helix angle will necessarily vary from one end to the other. However, the novel teeth resulting from practice of the method of this invention, enable meshing with an accuracy heretofore not deemed possible. Further, the ring gear thread has only about four turns, so that the error due to varying helix angle need not be accommodated for by varying the pitch of the jaw teeth.

It will be observed that, during cutting of the root, the crest of the jaw teeth is untouched. The end result may be seen in FIGS. 14 and 15 wherein the cutter 51 is shown in the process of cutting the teeth, these views being cross sections taken on the lines 14—14 and 15—15 of FIG. 11.

Figure 16:
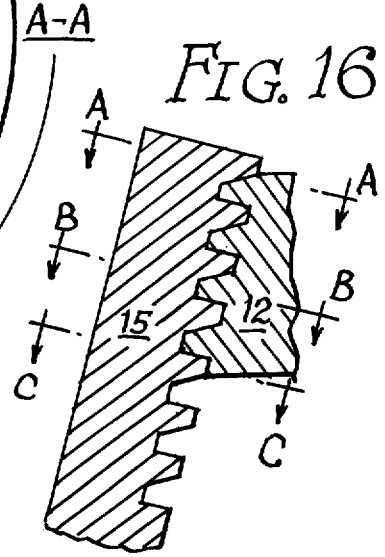
FIG. 16 is a cross section to show the relation between the ring gear thread and the jaw teeth when in operating relation.
Figure 18:
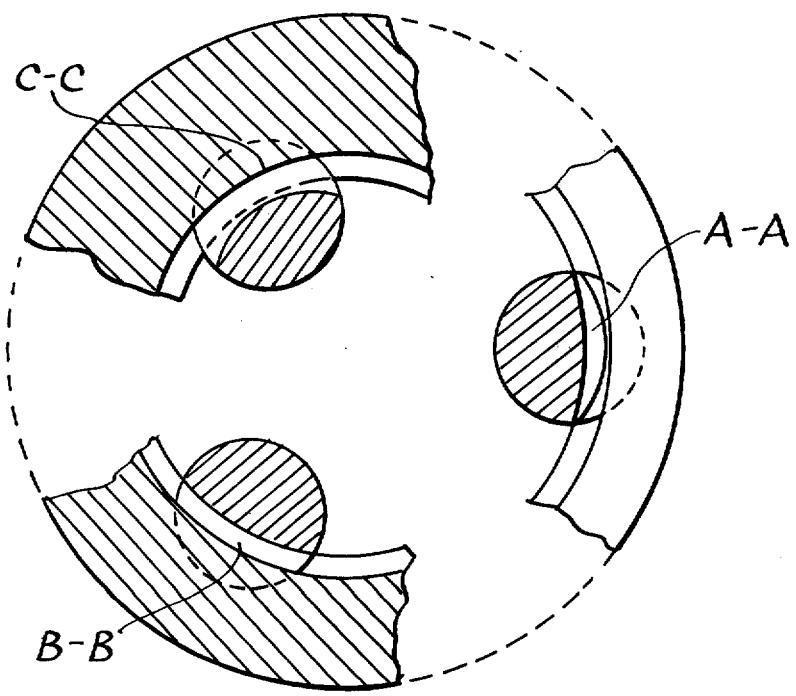
FIG. 18 is a cross section similar to that of FIG. 17, but showing a modified form of jaw.

By reason of the skewed position of the jaw during the blanking cut (FIGS. 6 to 10) and its reversely skewed position during the tooth-forming cut (FIGS. 11 to 15) the end result is that the teeth are disposed on a skewed plane, whereby the desired compromise fit between the jaws and ring gear is obtained. Turning to FIG. 16, there is shown one jaw 15 in its assembled relation with the ring gear 12, the jaw being shown in its fully-extended position (FIG. 1). FIG. 17 is a composite top plan view and cross section taken on the lines A—A, B—B and C—C of FIG. 16. At the plane A—A, the pitch "circle" of the ring gear has its maximum diameter and this corresponds to the section 15—15 of FIG. 11 and is illustrated in FIG. 15. At the plane B—B, the pitch "circle" of the ring gear has essentially a diameter which is the mean of the maximum and minimum diameters at A—A and C—C, respectively.

The cutting of the blank jaw (FIG. 6) and forming the threads therein (FIG. 11) are so calculated that, at approximately the mid-point (measured axially) of the jaw, the teeth R' and r' are essentially in perfect mesh with the ring gear thread (B—B in FIG. 17), except for conventional running tolerance; at A—A the crest of the jaw teeth R is virtually congruent with the ring gear thread at its maximum pitch "circle" diameter (A—A in FIG. 17) and the root of the jaw teeth have clearance and, at C—C, the crest of the jaw teeth r has very little, if any, correspondence with the ring gear thread, but the root R' has good correspondence.

As will have become apparent from the preceding description, compromise fits between the ring gear thread and the teeth of the jaws are obtained by using the principles of the invention. In the prior art, no attempt has been made to justify the fit between the ring gear thread and the jaw teeth. Stated otherwise, prior practice in cutting the jaw teeth has been to treat these teeth as simple rack teeth, i.e. as uniform from one end to the other. The present invention takes into account the varying pitch "circle" diameter of the ring gear thread and accommodates therefor by variation of the tooth form of the jaws. In a broad sense, the tooth form approximately mid-way of the axial extent of the teeth is an "average" of the tooth forms in regions at the respective ends of the jaw teeth array.

The advantages just pointed out may be obtained in several ways, depending upon the geometry of the ring gear thread-jaw teeth assembly. One variable resides in the angular offset of the jaw axis to accommodate the helix angle (FIG. 9), and the other resides in skewing of the surface corresponding to what may be called the pitch "circle" surface of the jaw teeth (FIGS. 10 and 13).

The invention jaws lend themselves ideally to powdered metal techniques. Since some inaccuracy is to be expected with this method it is accommodated to a large extent by the use of jaws as disclosed herein.

Furthermore, the gain in accuracy of jaws embodying the invention may permit relaxing the tolerance of the body.

I claim:

1. In a Jacobs-type machine chuck having a principal axis of rotation comprising a plurality of jaws each having a gripping portion and a guiding portion of cylindrical form slidably carried in the body of the chuck, the axis of the jaws being inclined to said principal axis and means to displace the jaws convergently and divergently to grip and release respectively a part to be seized in the chuck, said means comprising a ring gear having at least one tooth and rotatably carried on said body, the ring gear tooth conforming substantially to a conical helix, each jaw having a plurality of teeth to mesh with said ring gear tooth whereby rotation of the ring gear is translated into concurrent axial and radial displacement of the jaws, corresponding to convergent and divergent movement thereof, the improvement wherein the jaw teeth have a crest corresponding to a substantially frusto-conical surface having its larger radius greater than the radius of the guiding portion of the jaw and a root corresponding to a second substantially frusto-conical surface, the larger radius of the first frusto-conical surface being less at the end of the jaw which is innermost of the chuck and greater at the other end thereof, and the radius of the second frusto-conical surface being greater at the first mentioned end of the jaw than at the opposite end thereof.

2. The combination in accordance with claim 1 further characterized in that the radius of the crest of the jaw teeth varies from one end of the jaw to the other, being greatest at the end adjacent the larger diameter of the ring gear tooth and least at the end adjacent the smaller diameter of the ring gear tooth.

3. In a Jacobs-type machine chuck comprising a plurality of jaws each having a gripping portion and a guiding portion of cylindrical form slidably carried in the body of the chuck and means to translationally displace the jaws convergently and divergently to cause the same to grip and release respectively a part to be seized in the chuck, said means comprising a ring gear having at least one tooth and rotatably carried on said body, the ring gear tooth conforming substantially to a conical helix, each jaw having a plurality of teeth in mesh with said ring gear tooth whereby rotation of the ring gear is translated into concurrent axial and radial displacement of the jaws between divergent and convergent relation, the improvement wherein the jaw teeth have a crest lying on a curved plane which, in all positions of the jaws, is non-congruent with the conical helical surface passing through the root of the ring gear tooth.

4. The combination in accordance with claim 3 in which said plane is a segment of a skewed cylindrical surface.

5. The combination in accordance with claim 2 further characterized in that the respective root surface of the jaw teeth lie on a substantially cylindrical surface, the axis of the cylinder being inclined with respect to the axis of the jaw.

6. The combination in accordance with claim 1 in which the outermost surface of the individual crests of the jaw teeth, considered as a group, are disposed on a curved surface having a radius of curvature at any plane perpendicular to the principal axis of the ring gear which is less than the radius of curvature, measured in the same plane, of the ring gear tooth.

7. In a Jacobs-type machine chuck having a principal axis of rotation comprising a plurality of jaws each having a gripping portion and a guiding portion of cylindrical form slidably carried in the body of the chuck, the axis of the jaws being inclined to said principal axis and means to displace the jaws convergently and divergently to cause the same to grip and release respectively a part to be seized in the chuck, said means comprising a ring gear having at least one tooth and rotatably carried on said body, the ring gear tooth conforming substantially to a conical helix, each jaw having a plurality of teeth to mesh with said ring gear tooth whereby rotation of the ring gear is translated into concurrent axial and radial displacement of the jaws corresponding to convergent and divergent movement thereof, the improvement wherein the teeth of each jaw regarded as a group lie on a line which is a conical helix conforming substantially in angle and pitch to a frusto-conical surface having its axis on the axis of the chuck, said frusto-conical surface having its smaller end disposed toward the gripping end of the jaw, the apex angle of said frusto-conical surface being greater than the apex angle of the conical helix of the ring gear tooth whereby the jaw teeth have a greater degree of engagement with the ring gear tooth toward the gripping end of the jaws and a lesser degree of engagement at the opposite end of the jaws.

8. The combination in accordance with claim 1 further characterized in that the axis of the first frusto-conical surface is at an angle to the axis of the jaw, said angle being greater than the angle between the jaw axis and said principal axis.

* * * * *